United States Patent [19]

Konig et al.

[11] 3,723,392
[45] Mar. 27, 1973

[54] POLYURETHANES BASED ON 2,3-DIBROMO-BUT-2-ENE-1,4-DIOL

[75] Inventors: Klaus Konig; Erwin Muller; Kuno Wagner, all of Leverkusen, Germany

[73] Assignee: Bayer Aktiengesellschaft, Leverkusen, Germany

[22] Filed: Jan. 17, 1972

[21] Appl. No.: 218,470

Related U.S. Application Data

[63] Continuation of Ser. No. 38,902, May 19, 1970.

[30] Foreign Application Priority Data

May 24, 1969 Germany.................P 19 26 661.6

[52] U.S. Cl..260/75 NP, 260/77.5 AM, 260/77.5 SP
[51] Int. Cl.................................................C08g 22/16
[58] Field of Search.......260/2.5 AI, 2.5 AJ, 2.5 AM, 260/75 NP, 77.5 AM, 77.5 AP, DIG. 24

[56] References Cited

UNITED STATES PATENTS

| | | | |
|---|---|---|---|
| 3,676,380 | 7/1972 | McLaughlin et al. | 260/2.5 |
| 2,729,618 | 1/1956 | Mueller et al. | 260/75 |
| 2,753,319 | 7/1956 | Brockway | 260/30.6 |
| 2,929,800 | 3/1960 | Hill | 260/77.5 |
| 3,100,759 | 8/1963 | Boussu et al. | 260/77.5 |
| 3,219,634 | 11/1965 | Watson et al. | 260/77.5 |
| 3,475,383 | 10/1969 | Stewart | 260/75 |

*Primary Examiner*—Donald E. Czaja
*Assistant Examiner*—H. S. Cockeram
*Attorney*—Robert A. Gerlach et al.

[57] ABSTRACT

Noncellular polyurethane plastics are prepared from organic compounds having hydroxyl groups and a molecular weight from about 800 to about 3,000, organic diisocyanates and 2,3-dibromobut-2-ene-1,4-diol. The polyurethane elastomers due to their improved chemical and thermal stability are eminently suitable in the production of molded articles.

3 Claims, No Drawings

POLYURETHANES BASED ON 2,3-DIBROMO-BUT-2-ENE-1,4-DIOL

This is a continuation of application Ser. No. 38,902, filed May 19, 1970.

This invention is a continuation of application Ser. No. 38,902 filed May 19, 1970 now abandoned, and relates to nonporous polyurethane plastics and to a process for the preparation thereof. More particularly this invention relates to the use of a particular diol as a chain extender for the production of polyurethane plastics.

German Pat. No. 1,096,032 describes a process for the production of cross-linked synthetic polyurethane plastics having a high hardness and elasticity by reacting an organic compound containing hydroxyl groups and having a relatively high molecular weight with an excess of from about 300 to about 900 mol percent based on the hydroxyl groups of the polyhydroxy compound of an organic polyisocyanate and reacting the resulting prepolymer simultaneously while shaping into the desired configuration with less than a stoichiometric quantity of a saturated glycol containing secondary hydroxyl groups.

When prepolymers containing an excess of 300 to 900 percent of an organic polyisocyanate, such as described above are used together with glycols containing primary hydroxyl groups with simultaneous shaping, a very short period of time is available for the setting of the resin, that is the period of time defined by the mixing of the primary hydroxyl containing glycol with the prepolymer as one extreme and the solidification of the reaction mixture as the other extreme, is extremely short thus the processing conditions are inadequate because setting of the polymer occurs too rapidly. Further, this period of time also varies with respect to the excess of isocyanate used in the preparation of the prepolymer. Thus, when the excess of isocyanate is increased the setting time becomes shorter. However, in order to obtain products having high hardness and elasticity, it was necessary to use the large excess of isocyanate in the preparation of the prepolymer, therefore, it became necessary to use saturated glycols containing only secondary hydroxyl groups to chain extend these prepolymers and still provide a period of time long enough to accomplish the desired results.

Of the saturated glycols containing secondary hydroxyl groups, butane-2,3-diol which is a mixture of 80 percent of meso- and 20 percent of the D,L-butane-2,3-diol, has proven satisfactory in practice.

It is an object of this invention to provide nonporous polyurethane polymers having improved physical properties. It is another object of this invention to provide polyurethane polymers having improved flame resistance. It is another object of this invention to provide an improved process for the preparation of nonporous polyurethane plastics. It is another object of this invention to provide a method of preparing nonporous polyurethane plastics wherein the casting time of the polymer is comparatively long while the curing time is short.

The foregoing objects and others which will become apparent from the following descriptions are accomplished by the method of the invention generally speaking by providing polyurethane elastomers having the units —OGO— wherein G is the residue remaining after the removal of at least two hydroxyl groups from a polymeric polyhydric alcohol having a molecular weight of from about 200 to about 3,000.

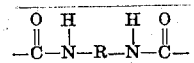

wherein R is the residue remaining after the removal of two NCO groups from an organic diisocyanate and —OR'—O—, wherein at least 50 percent by weight of R' is the divalent radical.

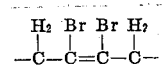

and the balance of R' is the residue remaining after the removal of the two hydroxyl groups from an organic glycol. The invention further contemplates the method of preparing nonporous polyurethane plastics by reacting an organic compound having hydroxyl groups and a molecular weight of from about 800 to about 3,000, an organic diisocyanate and 2,3-dibromobut-2-ene-1,4-diol.

One technique of carrying out the present process is by reacting the dehydrated, hydroxyl compound of relatively high molecular weight with an excess of an organic diisocyanate. A smaller quantity of 2,3-dibromobut-2-ene-1,4-diol, based on the free NCO groups, is then added to the liquid melt, and casting is carried out while shaping the melt.

In a variant of this process, a quantity of 2,3-dibromobut-2-1,4-diol which is equivalent or almost equivalent to the excess of diisocyanate is added, and in this way polyaddition products are obtained which can be dissolved and cast or spun in organic solvents, e.g., in dimethyl formamide or methyl ethyl ketone and others.

In still another embodiment of this invention, the prepolymer is reacted with a larger quantity of 2,3-dibromobut-2-ene-1,4-diol than that calculated from the free NCO groups. In this way, storable and rollable polyaddition products are obtained which, after adding peroxides or diisocyanates, (e.g., dimeric tolylene diisocyanate), can be converted with shaping into the crosslinked state.

According to still another embodiment of the invention, it is possible to produce products which can be processed thermoplastically and which can be shaped as granules in an injection molding machine. In this technique, the reactive components are mixed and caused to partially react. The reaction is then interrupted while the polymer is in a solid but thermoplastic state. Either all the reactive components can be mixed at once or a prepolymer technique may be used.

In order to vary the properties or the processing conditions, it is obviously also possible to use mixtures of 2,3-dibromobut-2-ene-1,4-diol with other glycols, e.g. with butane-2,3-diol, ethylene glycol, 1,3-propane diol, 1,4-butane diol, 1,6-hexane diol, neopentyl glycol, 1,2-propane diol and the like.

As starting materials for the products according to the invention, any suitable compound containing at least two hydroxyl groups and having a molecular weight from about 800 to about 5,000, and preferably from about 800 to about 3,000 may be used, such as, for example, hydroxyl polyesters, polyester amides, polyhydric polyalkylene ethers, polyhydric polythioethers, polyacetals and the like. Any suitable hydroxyl polyester may be used such as, for example, the reaction product of a polycarboxylic acid and a polyhydric alcohol. Any suitable polycarboxylic acid may be used in the preparation of the polyesters, such as, for example, adipic acid, succinic acid, suberic acid, sebacic acid, oxalic acid, methyl adipic acid, glutaric acid, pimelic acid, azelaic acid, phthalic acid, terephthalic acid, isophthalic acid, thiodiglycollic acid, thiodipropionic acid, maleic acid, fumaric acid, citraconic acid, itaconic acid, benzene tricarboxylic acid and the like. Of course, the corresponding acid anhydrides may also be used. Any suitable polyhydric alcohol may be used in the preparation of the polyesters, such as, for example, ethylene glycol, propylene glycol, butylene glycol, hexanediol, bis-(hydroxy-methyl cyclohexane), 1,4-butanediol, diethylene glycol, neopentyl glycol, polyethylene glycol, 2,2-dimethyl propylene glycol, xylylene glycol, trimethylol ethane, trimethylol propane, glycerine, pentaerythritol, sorbitol, and the like. Also included in the definition of hydroxyl polyesters are lactone polyesters such as a caprolactone polyesters and also polycarbonates such as 1,6-hexane diol polycarbonates and the like, It is generally preferred that the polyurethane elastomeric plastics have a substantially linear configuration and, therefore, the difunctional acids and alcohols are preferred.

Any suitable polyhydric polyalkylene ether may be used such as, for example, the condensation product of an alkylene oxide with a small amount of a compound containing active hydrogen containing groups such as, for example, water, ethylene glycol, propylene glycol, butylene glycol, amylene glycol and the like. Any suitable alkylene oxide condensate may also be used such as, for example, condensates of ethylene oxide, propylene oxide, butylene oxide, amylene oxide, styrene oxide, and mixtures thereof. The polyalkylene ethers prepared from tetrahydrofuran may also be used. The polyhydric polyalkylene ethers may be prepared by any known process such as, for example, the process described by Wurtz in 1859 and in the "Encyclopedia of Chemical Technology"; Volume 7, pages 257 to 262, published by Interscience Publishers in 1951 or in U.S. Pat. No. 1,922,459.

Any suitable polyhydric polythioether may be used such as, for example, the reaction product of one of the aforementioned alkylene oxides used in the preparation of the polyhydric polyalkylene ether with a polyhydric thioether such as, for example, thiodiglycol, 3,3'-dihydroxy propyl sulphide, 4,4'-dihydroxy butyl sulphide, 1,4-(β-hydroxy ethyl) phenylene dithioether and the like.

Any suitable hydroxyl polyester amide may be used such as, for example, the reaction product of an amine and/or amino alcohol with a carboxylic acid. Any suitable amine such as, for example, ethylene diamine, propylene diamine, and the like may be used. Any suitable amino alcohol such as, for example, β-hydroxy ethyl amine and the like may be used. Any suitable polycarboxylic acid may be used such as, for example, those more particularly described above for the preparation of the hydroxyl polyesters. Further, a mixture of a glycol and an amino alcohol or polyamine may be used. Any of the glycols mentioned for the preparation of the polyesters may be used.

Any suitable hydroxyl polyacetal may be used such as, for example, the reaction product of an aldehyde and a polyhydric alcohol. Any suitable aldehyde may be used such as, for example, formaldehyde, paraldehyde, butylaldehyde and the like. Any of the polyhydric alcohols mentioned above in the preparation of the hydroxyl polyesters may be used. Any of the polyacetals set forth in U.S. Pat. No. 2,961,428 may be used. Also, mixtures of the various higher molecular weight hydroxyl compounds can be used.

Any suitable organic diisocyanates may be used in the process according to the invention such as, for example, aliphatic, cycloaliphatic, araliphatic and aromatic diisocyanates, for example, 1,2-ethylene diisocyanate, 1,4-butane diisocyanate, 1,6-hexamethylene diisocyanate, cyclopentylene 1,3-diisocyante, cyclohexane-1,4-diisocyanate, 1-methyl cyclohexane-2,4-diisocyanate or 1-methyl cyclohexane-2,6-diisocyanate and their isomer mixtures, isophorone diisocyanate, m- and p-xylylene diisocyanates, tolylene-2,4-diisocyanate and tolylene-2,6-diisocyanate or any arbitrary mixtures of these isomers, diphenylpropane diisocyanate, diphenyl,4,4'-diisocyanate, furfurylidene diisocyanate, 2,7-diisocyanato-dibenzofuran and the like. Particularly preferred are 4,4'-diphenylmethane diisocyanate, p-phenylene diisocyanate and also 4,4'-diphenyl ether diisocyanate, 4,4'-diphenylethane diisocyanate and 1,5-naphthylene diisocyanate.

By using the process according to the invention, it is possible to produce both highly elastic casting resins and synthetic polyurethane plastics which can be processed thermoplastically and which are suitable for the production of shaped components of many different types, and which are characterized by an improved resistance to combustion when compared with the previously known polyurethane elastomers.

The invention is further illustrated but is not intended to be limited by the following examples in which all parts and percentages unless otherwise specified are by weight.

EXAMPLE 1

About 200 parts of an hydroxy polyester prepared from about 11 mols of ethylene glycol and 10 mols of adipic acid and having an average molecular weight of 2,000 (CH number 56) are dehydrated at 130°/12 mm Hg. About 36 parts of naphthylene-1,5-diisocyanate are then incorporated with stirring at the same temperature and are allowed to react for about 30 minutes under vacuum. About 10.9 parts of 2,3-dibromobut-2-ene-1,4-diol are then introduced. After a stirring time of about 3 minutes, the mixture is poured into a waxed, preheated mold and heated for another 24 hours at about 100°. The shaped molding which is obtained has the following properties:

| | |
|---|---|
| Shore hardness A: | 81 |
| Tensile strength: | 326 kg/cm² |
| Elongation at break: | 585 per cent |
| Permanent elongation: | 9 per cent |
| Tearing resistance: | 34 kg/cm |
| Elasticity: | 50 |

| Example No. | Prepared according to Example 1 | Shore A | Tensile strength, kg./cm.² | Elongation at break, percent | Permanent elongation | Tearing resistance, kg./cm. | Elasticity |
|---|---|---|---|---|---|---|---|
| 2 | 200 parts polyester of Example 1; 60 parts 1,5-naphthylene diisocyanate; 38.2 parts 2,3-dibromobut-2-ene-1,4-diol. | 95 | 187 | 342 | 24 | 47 | 40 |
| 3 | 200 parts polyester of Example 1; 80 parts 1,5-naphthylene diisocyanate; 63 parts dibromobut-2-ene-1,4-diol. | 97 | 204 | 355 | 59 | 58 | 46 |
| 4 | 200 parts polyester of Example 1; 80 parts 4,4'-diphenylmethane diisocyanate; 46.7 parts dibromobut-2-ene-1,4-diol. | 34 | 243 | 420 | 12 | 31 | 28 |
| Comparison example. | 200 parts polyester of Example 1; 36 parts 1,5-naphthylene diisocyanate; 4 parts butane-2,3-diol. | 70 | 240 | 650 | 7 | 43 | 46 |
| 5 | 200 parts 1,6-hexane diol polycarbonate (mol. wt. 2,000. OH No. 56); 58.8 parts hexamethylene diisocyanate; 55.3 parts 2,3-dibromobut-2-ene-1,4-diol. | 91 | 167 | 420 | 15 | 18 | 40 |
| 6 | 200 parts mixed polyester of adipic acid and hexane-1,6-diol neopentyl glycol in molar ratio 12:11 (mol. wt. 1,700, OH No. 66); 80 parts 4,4'-diphenylmethane diisocyanate; 44 parts 2,3-dibromobut-2-ene-1,4-diol. | 76 | 182 | 282 | 10 | 18 | 26 |
| 7 | 200 parts 1,4-butylene polyester (mol. wt. 2200, OH No. 51); 80 parts 4,4'-diphenyl methane diisocyanate; 51.7 parts 2,3-dibromobut-2-ene-1,4-diol. | 81 | 153 | 392 | 17 | 20 | 45 |
| 8 | 200 parts polyester of Example 1; 125 parts 4,4'-diphenylmethane diisocyanate; 46.2 parts 2,3-dibromobut-2-ene-1,4-diol; 16.9 parts butane-2,3-diol. | 94 | 193 | 320 | 26 | 55 | 43 |

TABLE I

| Example | bromine content (%, related to polyurethane) | casting time (min.) |
|---|---|---|
| 1 | 2,85 | 5 |
| 2 | 8,3 | 2½ |
| 3 | 11,9 | 2 |
| 4 | 9,3 | 3 |
| 5 | 11,5 | 2½ |
| 6 | 8,8 | 3½ |
| 7 | 10,2 | 5 |
| 8 | 7,7 | 3 |

Table I shows the bromine content of the polyurethanes prepared according to the examples and the casting times. In order to test the effect of the bromine content on the resistance to combustion following tests have been carried out:

1. ASTM-test D 635–663
2. DIN-test 54359
3. DIN-draft test 53438

It has been established that all the polyurethanes of the examples with the exclusion of Example 1 are flame proved according to these tests.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. A nonporous polyurethane elastomer having the units

—OGO— wherein G i the residue remaining after the removal of two hydroxyl groups from a polymeric polyhydric alcohol having a molecular weight of from about 800 to about 3000;

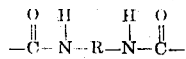

wherein R is the residue remaining after the removal of two -NCO groups from an organic diisocyanate; and

—OR'—O wherein at least 50 percent by weight of R' is

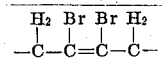

and the balance a glycol selected from the group consisting of butane-2,3-diol; ethylene glycol; 1,3-propane diol; 1,4-butane diol; 1,6-hexane diol; neopentylglycol; 1,2-propane diol and mixtures thereof.

2. The polyurethane elastomer of claim 1 wherein R' is 100 percent

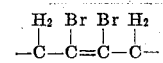

3. The polyurethane elastomer of claim 1 wherein R' is a

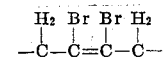

and

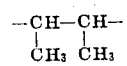

* * * * *